July 9, 1963 R. W. ASTHEIMER ET AL 3,097,298
INFRARED COMPARISON MICROMETER
Filed May 25, 1960 2 Sheets-Sheet 2
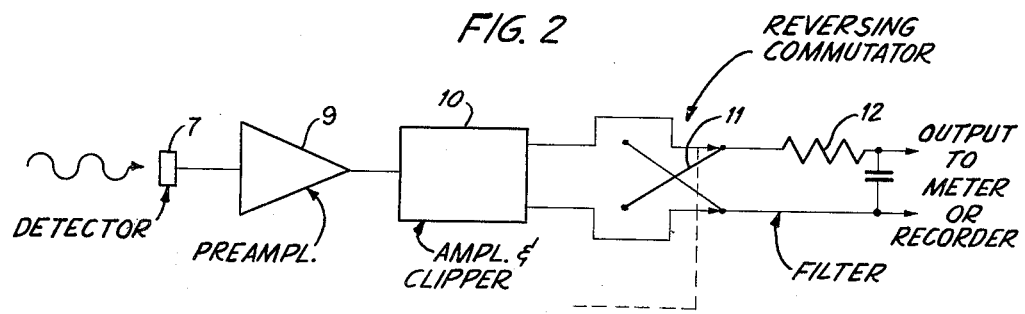
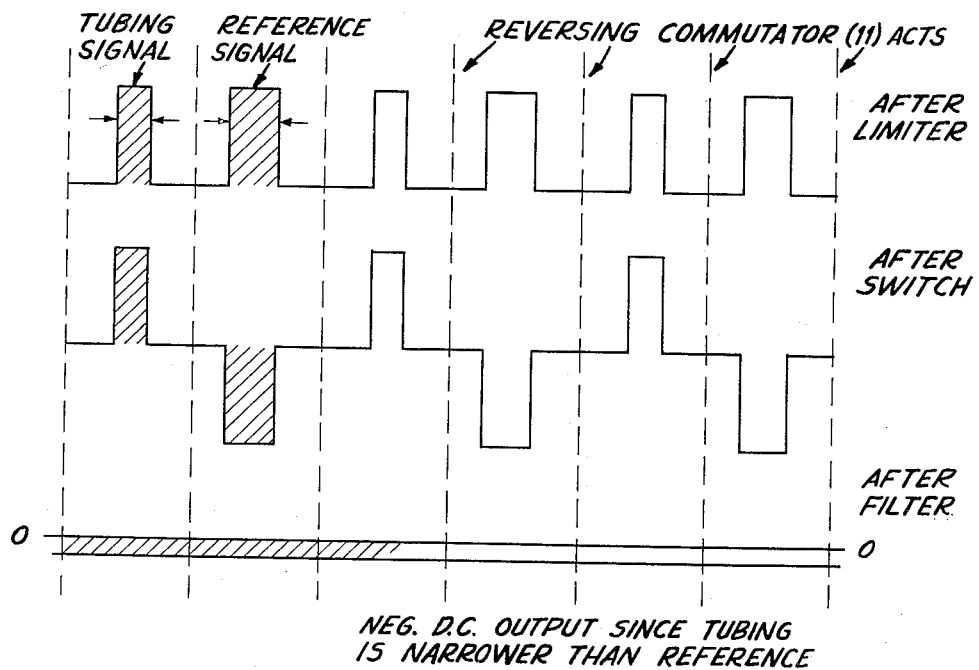
INVENTORS.
ROBERT W. ASTHEIMER
BY MONTY M. MERLEN
ATTORNEY

# United States Patent Office 3,097,298
Patented July 9, 1963

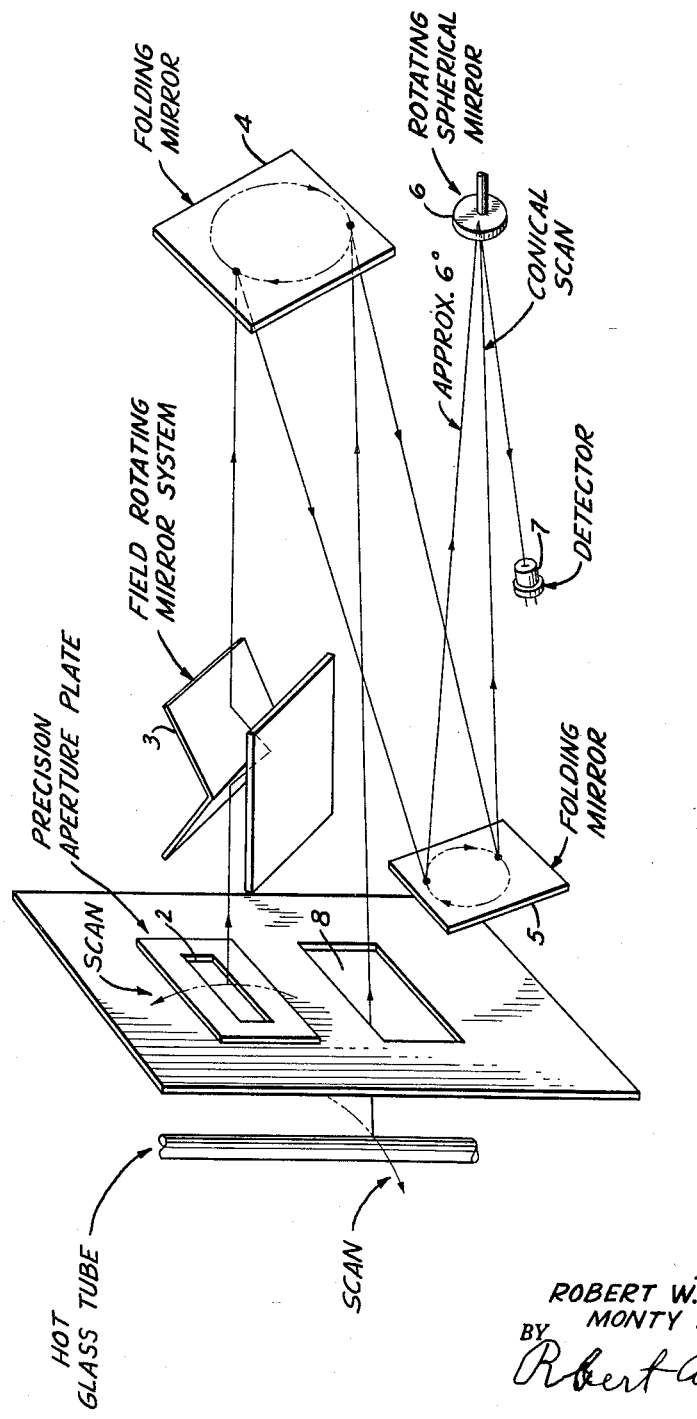

3,097,298
INFRARED COMPARISON MICROMETER
Robert W. Astheimer, Westport, and Monty M. Merlen, Stamford, Conn., assignors to Barnes Engineering Company, Stamford, Conn., a corporation of Delaware
Filed May 25, 1960, Ser. No. 31,583
6 Claims. (Cl. 250—83.3)

This invention relates to an infrared comparison micrometer for the continuous measurement of materials by their own infrared emission.

The measurement of the width, or in the case of round materials outside diameter, of continuously extruded or processed material presents a real problem in practical manufacture especially where very close tolerances are required. Typical examples are the continuous drawing of hot glass tubes, steel ribbons, hot drawn steel wires or rods and the like. These materials are good infrared emitters and are very suitable for continuous monitoring by means of the present invention. Materials which are extruded or drawn at lower temperatures are not excluded provided there is a sufficient difference between the material and background temperatures but the measurement is not as easy as with hotter materials such as hot glass tubing where the relatively high infrared radiation energy does not put excessive demands on the sensitivity of the instrument. The invention will be described in conjunction with continuous monitoring of the outside diameter of hot glass tubing which, however, is a typical illustration only of one of the materials for which the present invention is suitable.

Essentially the present invention compares the radiation obtained by scanning across a hot tube, strip, wire or other material to be measured with radiation of approximately the same intensity obtained by scanning across an accurately dimensioned slot which is illuminated thereby. It is not essential that the two radiation intensities be exactly the same but it is desirable that they should be approximately the same so that the clipping function of the electronic circuits, which will be referred to below, need not operate over too wide a range. This approximation is most conveniently obtained by using the tubing itself as the reference radiation source illuminating the slot. The two scanning fields may advantageously be at right angles to each other. The particular angular relationship is not critical though, of course, the field across the tube must be accurately normal to the tube axis. During the other scanning the measuring slot must be fully illuminated at all times. Several optical techniques can be used for fully illuminating the slot. A simple one is to rotate the tube image so the length of the tubing appears across the slot.

It should also be noted that an entirely separate source of radiation such as a hot plate could be used for illuminating the reference slot with infrared radiation.

As the fields are scanned signals are produced by an infrared detector, amplified electronically, clipped, and commutated followed by an output circuit providing integration. When the tube width is exactly the same as the width of the reference slot there will be no signal in the output circuit but if the widths vary there will be a signal the polarity of which depends on whether the tube is wider or narrower than the slot.

The present invention ceases when the final output signal is produced and the uses to which the signal is put do not, of themselves, form any part of the invention. Thus they can actuate a meter in which case the instrument becomes a continuous gage or they may sound an alarm if the tube width departs from predetermined tolerances or they may be used to control the tube drawing mechanism to restore the desired tube diameter.

One of the requirements for reliable operation of instruments of the present invention is that the material to be measured must be an infrared emitter but not an infrared transmitter, otherwise the radiation from the scan across the material may not be uniform and may not correspond exactly with the radiation from the lengthwise scan across the reference slot. In the case of some material such as hot steel there is substantial opacity to infrared radiations of all wavelengths. In the case of glass tubing, however, there is substantial transmission with most glasses in the near infrared and they do not become opaque, and hence pure emitters, until the wavelengths exceed 2 to $2.5\mu$. With glass, therefore, only infrared radiation longer than $2\mu$ or $2.5\mu$ may be used which requires a simple low pass filter. In another case the reverse situation may arise. Thus, for example, if the present invention is to be used to monitor the width of hot drawn germanium wire or tubing, wavelengths shorter than $1.8\mu$ must be used as germanium is more or less transparent for longer wavelengths. Where it is necessary to select the radiation band this is a simple matter and suitable filters are always available since it is not necessary to provide a narrow wavelength bandpass.

The nature of the material also determines the infrared detector to be used which, in turn, is affected by the temperature of the material. In the case of hot glass a lead selenide photoconductor detector is quite suitable. In the case of other materials requiring longer wave infrared or even the same material at lower temperatures other detectors are necessary such as, for example, thermistor bolometers. In general in the choice of detector the present invention does not depart from good infrared practice. The material or its temperature determines the wavelength range of the infrared which is emitted and the known suitable detectors and filters are then chosen. The invention is very flexible and can be used with a wide variety of materials which is an advantage. Similarly it is an advantage that the electronic circuits are standard in nature and present no design problems.

The accuracy of the present invention depends on the focal length of the optics used. In general the longer the focal length the greater the precision of the measurement. Also, the scan circle influences the accuracy. Small displacements of the glass tube do not significantly affect the accuracy of measurement with long focus optics with a reasonably large scan circle of lateral displacement has practically no effect. Displacement along the optic axis results only in defocusing and if the speed of the optics is kept moderate or low there is a good depth of field and this error becomes very slight. Because of the high infrared emission of hot glass tubing there is normally ample energy so that fast optics are not necessary. In a typical case with 60″ focal length optics of slow speed and a 3″ radius scan circle, a $\frac{1}{16}″$ axial displacement in a 1″ diameter tube will introduce an error of less than 0.1%. The same is true of lateral displacement of the same magnitude. Translating this into dimensions a typical instrument of the present invention can monitor the diameter of one inch tubing with an error of less than one-thousandth of an inch. This extremely high accuracy is one of the advantages of the present invention and it is obtained without particularly complex or sensitive equipment.

The invention will be described in greater detail in conjunction with the drawings in which:

FIG. 1 is a diagrammatic perspective drawing showing the optical path;

FIG. 2 is a diagrammatic representation of the electronic circuits, and

FIG. 3 illustrates the output signals when the tubing is narrower than the reference slot.

In FIG. 1 a hot glass tube is shown at 1 passing the instrument being formed at several feet a second. Infrared radiation from the hot glass tube passes through an accurately machined slot 2 and also through a relatively large opening 8. The beam passing through the slot 2 is turned at 90° by the mirror system 3 formed of three mirrors. A flat folding mirror 4 is then encountered and the beam passes onto a second folding mirror 5, a rotating spherical mirror 6 and is finally imaged in the form of a conical scan on the detector 7. In a similar manner infrared energy from the hot glass tube passes through the opening 8 is reflected by mirrors 4 and 5 and is also imaged on the detector 7. Because of the mirror system 3 the two scans are at right angles to each other as is shown by the curved arrows on the drawing. The scan circles are also illustrated by arrows on the two mirrors 4 and 5.

It will be apparent that the glass tube is first scanned horizontally and then vertically across the precision aperture plate 2. The duration of the infra red signal is determined by the width of the tube in the first scan and by the width of the slot of the aperture plate in the second.

The output signal from the detector 7 is amplified in a preamplifier 9 and then is processed in amplifying and clipping circuits 10. Finally a reversing commutator 11 driven in synchronism with the scanning mirror 6 reverses the polarity of the signals so that each scan has the opposite polarity. Finally the output signal is integrated as shown diagrammatically by the integrating circuit 12.

FIG. 3 shows the output wave shapes at the output of the amplifier and clipper 10 in the top line and after commutation in the middle line. The commutation points are shown at dash lines and are indicated by the commutator reference numeral 11.

In FIG 3 the situation is presented, considerably exaggerated, where the tube is narrower than the slot. After commutation and integration it will be apparent that there will be a net negative D.C. output which is shown by the narrow hatched area of the bottom of FIG. 3. If the tube diameter and reference slot were the same so would the width of the signals be and the net output after integration would, of course, be zero. If the tube becomes wider than the reference signal, a net positive D.C. voltage will obviously result.

In the drawings the optics have been shown folded which, with the long focus optics desirable for maximum accuracy, permits a more compact construction. The two folding mirrors, however, operate conventionally and if space economy is no object straight through optics may be used.

Similarly the rotation of the scan field by 90° for scanning the slot is shown as being effected by three mirrors. The same result may be effected by any optical device which produces the same degree rotation, for example, a Dove prism.

The precision aperture plate may be replaced by one with a different size slot for measuring a different size tube or if desired the slot may be made adjustable. Since the present invention finds its most important application in the monitoring of continuous production separate aperture plates for different tube sizes are preferable as the slot can be machined in a plate with great accuracy and a higher degree of accuracy is readily obtainable than is possible with an adjustable slot.

Also, of course, the instrument is simpler and more rugged. Changing slots is a simple matter and as it will only be done occasionally when different tube sizes come into question it does not constitute a drawback. Therefore, the fixed slot aperture plate constitutes the preferred modification of the present invention.

Catoptric scanning means are shown in the drawings. In infrared work this presents many advantages, however, the present invention does not depend on the details of the scanning mechanism and other known types of scanners producing the requisite conical scan may be used. In general it may be considered that the invention is a new combination of optical elements, the individual elements of which are not per se new. A new result is obtained, a very accurate measurement of tube width, and it is an advantage of the present invention that the device may be composed of known optical elements which are easily and economically obtainable.

We claim:

1. A device for continuously measuring the width of an infrared emitting, moving, elongated material which comprises in combination an infrared detector,
 (a) means for producing a continuous conical scan of the detector, one portion of the scan being at right angles to the moving material,
 (b) means for rotating the direction of scan of an opposite side of the cone through approximately 90°, a precision aperture plate with a precision slot scanned transversely by the rotated scan field said slot being oriented to receive infrared radiation from the moving hot material along the scan,
 (c) means for imaging both the slot and the moving material transversely scanned onto the detector whereby the detector produces an output signal alternately of the transversely scanned hot material and of the scanned precision slot, and
 (d) means for producing an output signal from the signals from the detector which is a function of the width of the moving material.

2. A device according to claim 1 in which the scanning means is a rotating spherical mirror.

3. A device according to claim 2 in which the approximately 90° rotation of scan field is effected by reflective means.

4. A device according to claim 2 in which the scanning beams are folded.

5. A device according to claim 1 comprising electronic amplifying and clipping means, commutating means reversing the polarity of the output signal from the amplifying and clipping means in synchronism with the two scans, means for connecting the output of the detector to the input of the amplifying and clipping means and means for integrating the commutated output signals.

6. A device according to claim 2 comprising electronic amplifying and clipping means, commutating means reversing the polarity of the output signal from the amplifying and clipping means in synchronism with the two scans, means for connecting the output of the detector to the input of the amplifying and clipping means and means for integrating the commutated output signals.

References Cited in the file of this patent

UNITED STATES PATENTS

| | | |
|---|---|---|
| 2,680,989 | Savitzky | June 15, 1954 |
| 2,761,350 | Hornig | Sept. 4, 1956 |
| 2,791,931 | Summerhaip | May 14, 1957 |
| 2,806,144 | Berger | Sept. 10, 1957 |
| 2,813,981 | Friedman | Nov. 19, 1957 |
| 2,882,416 | Fairbanks | Apr. 14, 1959 |
| 2,916,632 | Petterson | Dec. 8, 1959 |
| 2,931,917 | Beelitz | Apr. 5, 1960 |
| 2,941,443 | McNally | June 21, 1960 |
| 2,963,910 | Astheimer | Dec. 13, 1960 |
| 2,999,932 | Spooner | Sept. 12, 1961 |